United States Patent
Arena et al.

(10) Patent No.: US 9,786,894 B2
(45) Date of Patent: Oct. 10, 2017

(54) BATTERY PACK

(71) Applicant: LG Chem, Ltd., Seoul (KR)

(72) Inventors: Anthony Arena, Macomb, MI (US); Paul Laurain, Sterling Heights, MI (US)

(73) Assignee: LG Chem, Ltd., Seoul (KR)

( * ) Notice: Subject to any disclaimer, the term of this patent is extended or adjusted under 35 U.S.C. 154(b) by 213 days.

(21) Appl. No.: 14/531,696

(22) Filed: Nov. 3, 2014

(65) Prior Publication Data

US 2016/0126523 A1 May 5, 2016

(51) Int. Cl.
| | |
|---|---|
| *H01M 2/20* | (2006.01) |
| *H01M 2/30* | (2006.01) |
| *H01M 2/10* | (2006.01) |
| *H01M 10/0525* | (2010.01) |
| *H01M 10/625* | (2014.01) |
| *H01M 10/647* | (2014.01) |
| *H01M 10/6555* | (2014.01) |

(Continued)

(52) U.S. Cl.
CPC ......... *H01M 2/206* (2013.01); *H01M 2/1077* (2013.01); *H01M 2/202* (2013.01); *H01M 10/482* (2013.01); *H01M 10/613* (2015.04); *H01M 10/625* (2015.04); *H01M 10/647* (2015.04); *H01M 10/6555* (2015.04); *H01M 10/0525* (2013.01)

(58) Field of Classification Search
USPC .......................................................... 429/90
See application file for complete search history.

(56) References Cited

U.S. PATENT DOCUMENTS

| | | |
|---|---|---|
| 1,587,425 A | 6/1926 | Schepp |
| 2,273,244 A | 2/1942 | Cornelius |
| 2,391,859 A | 1/1946 | Babcock |

(Continued)

FOREIGN PATENT DOCUMENTS

| | | |
|---|---|---|
| DE | 19639115 A | 3/1998 |
| EP | 1577966 A | 9/2005 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Osei Amponsah
(74) *Attorney, Agent, or Firm* — Buckert Patent & Trademark Law Firm PC; John F. Buckert

(57) ABSTRACT

A battery pack includes a first battery module having first and second battery frame assemblies and first and second battery cells. The first battery frame assembly has a plastic frame member, a thermally conductive plate, a busbar, and a voltage sensing member. The plastic frame member has a rectangular ring-shaped body. The thermally conductive plate is coupled to rectangular ring-shaped body. The busbar has a first post and a first conductive body coupled to the first post. The first post extends outwardly from the plastic frame member, and the first conductive body extends through the rectangular ring-shaped body. The voltage sensing member has a first sensing post and a first sensing body. The first sensing post extends outwardly from the rectangular ring-shaped body.

10 Claims, 15 Drawing Sheets

(51) Int. Cl.
   *H01M 10/613* (2014.01)
   *H01M 10/48* (2006.01)

(56) References Cited

U.S. PATENT DOCUMENTS

| | | | |
|---|---|---|---|
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Hoerstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,724 B2 | 12/2006 | Hashizumi et al. |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0182493 A1 | 12/2002 | Ovshinsky et al. |
| 2003/0080714 A1 | 5/2003 | Inoue et al. |
| 2003/0211384 A1 | 11/2003 | Hamada et al. |
| 2004/0069474 A1 | 4/2004 | Wu et al. |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0072066 A1* | 3/2007 | Yoon ............... H01M 2/1077 429/99 |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0061299 A1* | 3/2009 | Uchida ............. H01M 2/1077 429/156 |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0155680 A1 | 6/2009 | Maguire et al. |
| 2009/0186265 A1* | 7/2009 | Koetting ............ H01M 6/5038 429/120 |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0189523 A1 | 8/2011 | Eom |
| 2012/0082880 A1 | 4/2012 | Koetting et al. |
| 2012/0141847 A1* | 6/2012 | Amagai ............. H01M 2/202 429/91 |
| 2012/0171543 A1 | 7/2012 | Hirsch et al. |
| 2013/0045410 A1 | 2/2013 | Yang et al. |
| 2013/0078487 A1* | 3/2013 | Shin ................. H01M 10/482 429/62 |
| 2013/0136136 A1 | 5/2013 | Ando et al. |
| 2013/0255293 A1 | 10/2013 | Gadawski et al. |
| 2013/0309542 A1 | 11/2013 | Merriman et al. |

(56) References Cited

U.S. PATENT DOCUMENTS

| | | |
|---|---|---|
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |
| 2014/0308558 A1 | 10/2014 | Merriman et al. |

FOREIGN PATENT DOCUMENTS

| | | |
|---|---|---|
| EP | 1852925 A | 11/2007 |
| EP | 2262048 A | 12/2010 |
| GB | 481891 A | 3/1938 |
| JP | 08111244 A | 4/1996 |
| JP | H09129213 A | 5/1997 |
| JP | H09219213 A | 8/1997 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 1020100119497 A | 11/2010 |
| KR | 1020100119498 A | 11/2010 |
| KR | 1020110013269 A | 2/2011 |
| KR | 1020110013270 A | 2/2011 |
| KR | 20110126764 A | 11/2011 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |
| WO | 2011145830 A2 | 11/2011 |

OTHER PUBLICATIONS

International Search Report for International application No. PCT/KR2013/004015 dated Sep. 26, 2013.

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

U.S. Appl. No. 13/936,556, filed Jul. 8, 2013 entitled Battery Assembly.

U.S. Appl. No. 14/059,547, filed Oct. 22, 2013 entitled Battery Cell Assembly.

U.S. Appl. No. 14/273,572, filed May 9, 2014 entitled Battery Pack and Method of Assembling the Battery Pack.

U.S. Appl. No. 14/328,000, filed Jul. 10, 2014 entitled Battery System and Method of Assembling the Battery System.

U.S. Appl. No. 14/330,163, filed Jul. 14, 2014 entitled Battery System and Method for Cooling the Battery System.

U.S. Appl. No. 14/511,389, filed Oct. 10, 2014 entitled Battery Cell Assembly.

U.S. Appl. No. 14/516,667, filed Oct. 17, 2014 entitled Battery Cell Assembly.

Written Opinion for International application No. PCT/KR2014/002090 dated May 26, 2014.

* cited by examiner

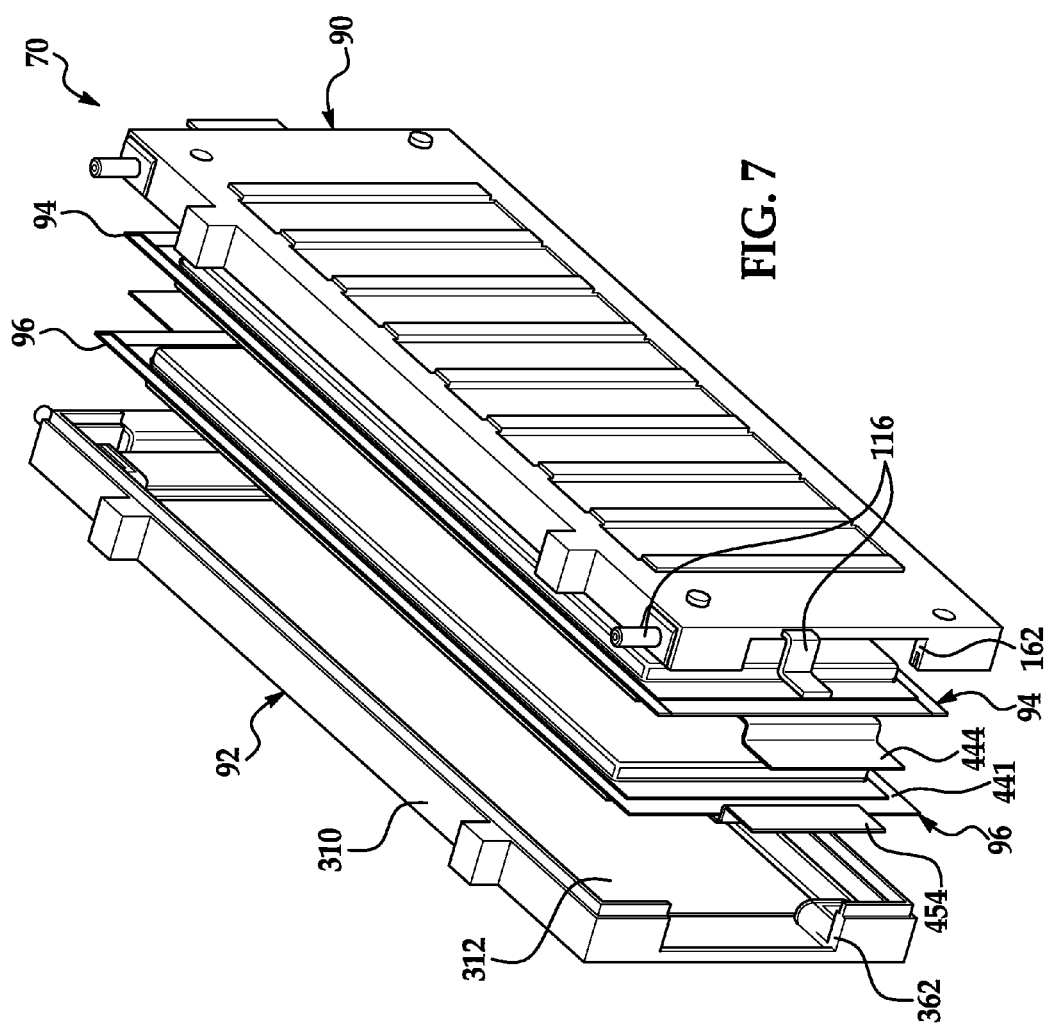

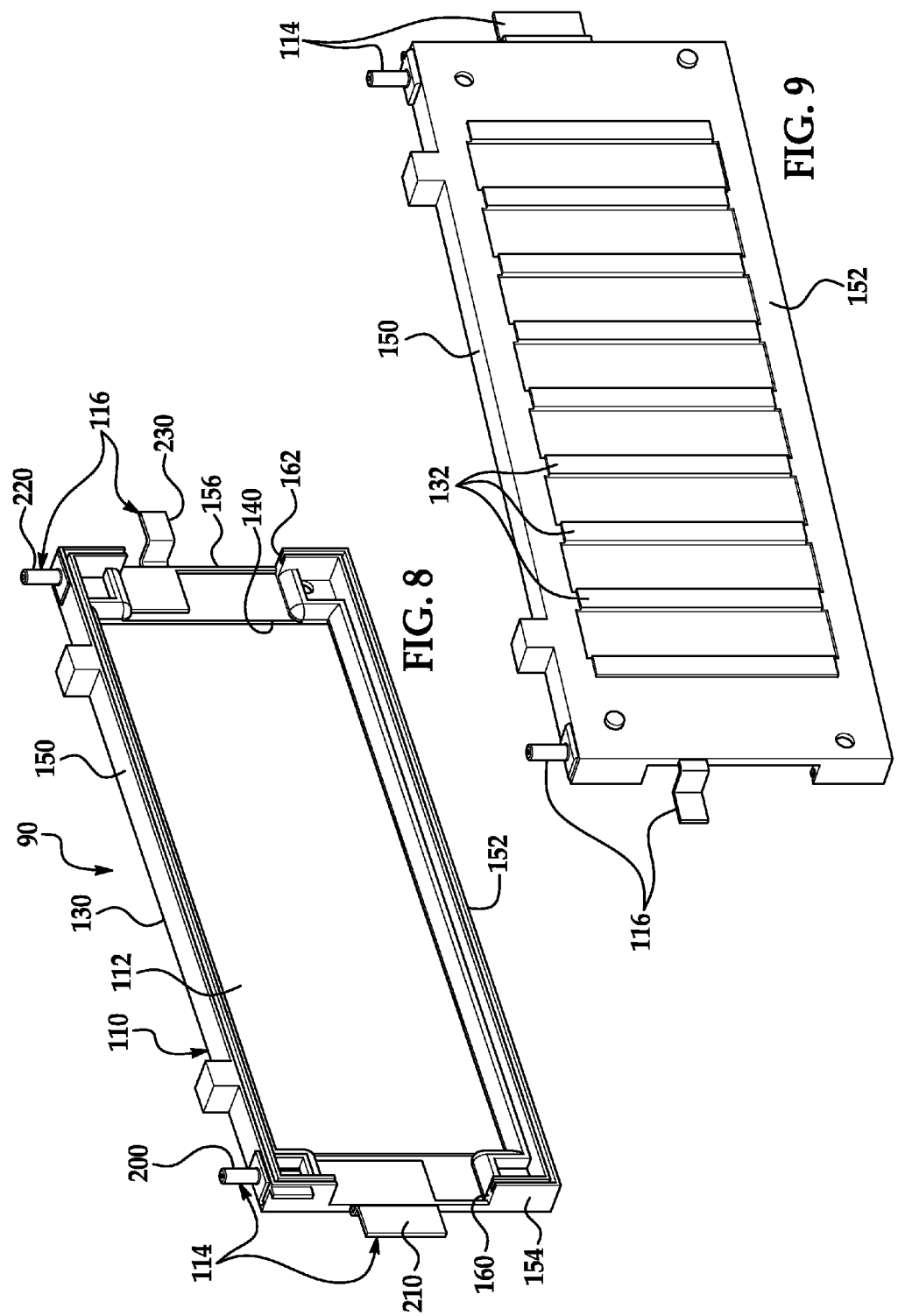

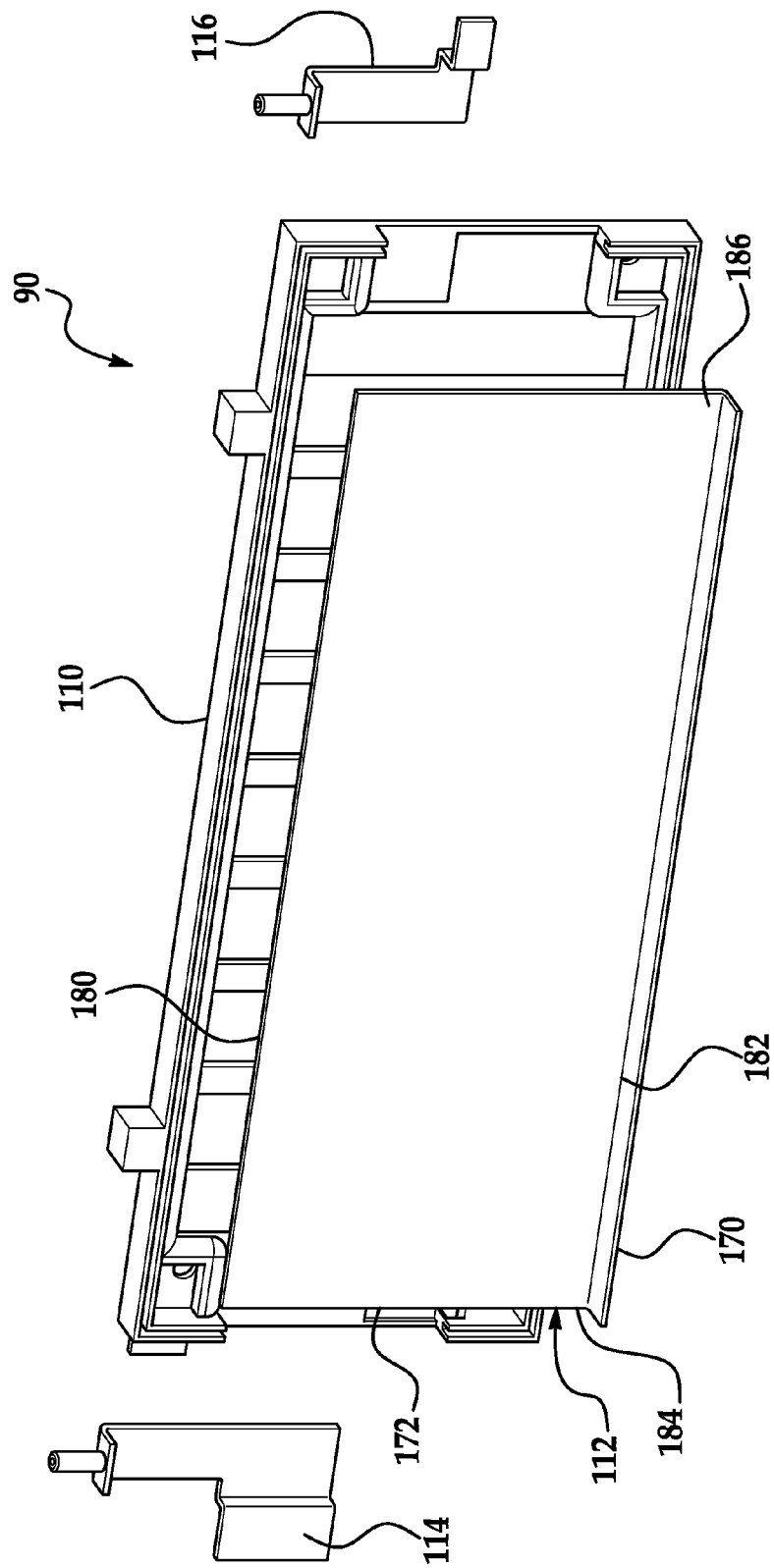

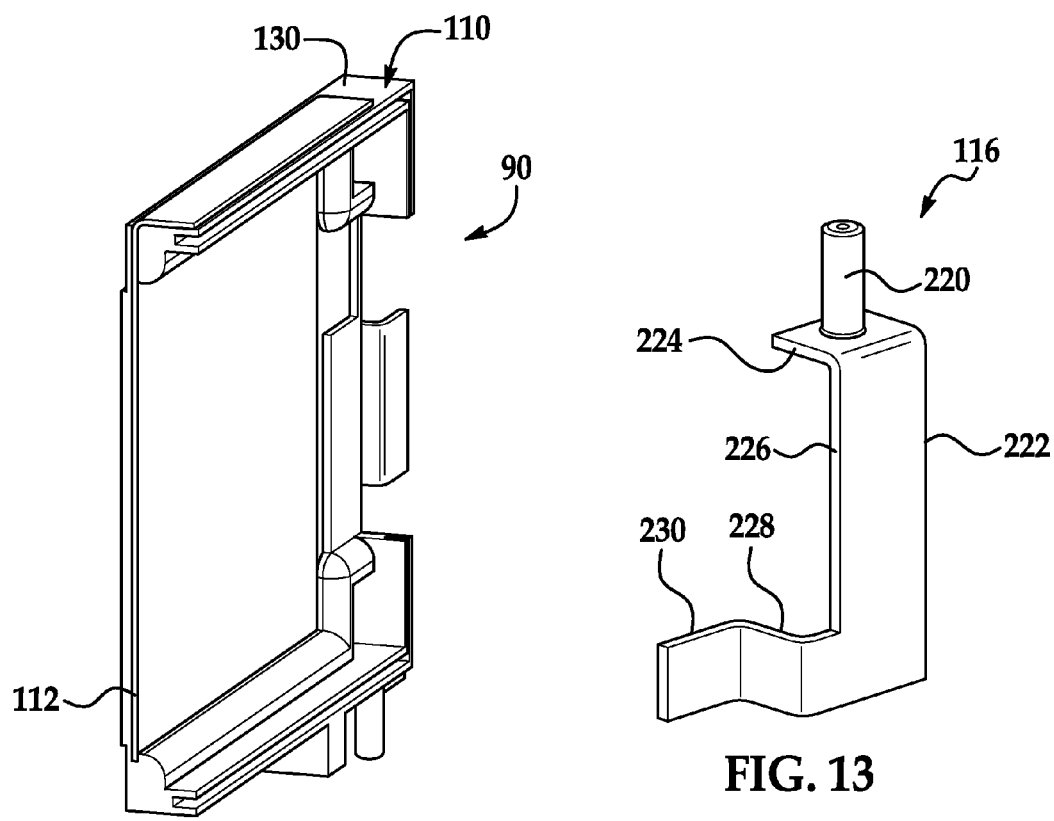
FIG. 12
FIG. 13
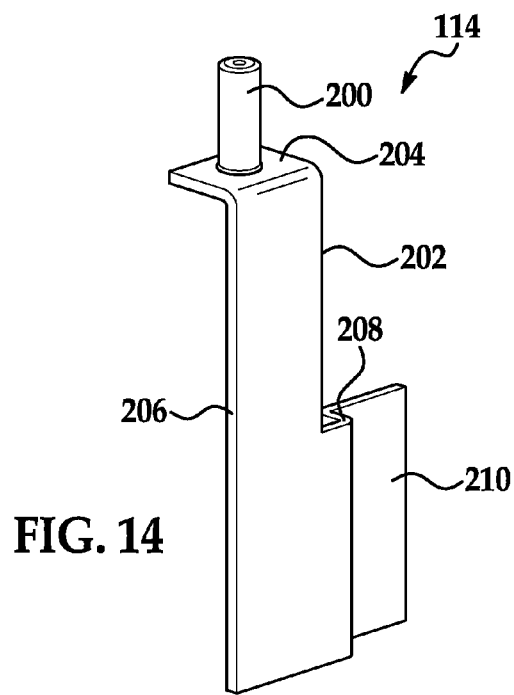
FIG. 14

US 9,786,894 B2

BATTERY PACK

BACKGROUND

The inventors herein have recognized a need for an improved battery pack that can be more easily manufactured.

SUMMARY

A battery pack in accordance with an exemplary embodiment is provided. The battery pack includes a first battery module having first and second battery frame assemblies and first and second battery cells. The first battery frame assembly has a first plastic frame member, a first thermally conductive plate, a first busbar, and a first voltage sensing member. The first plastic frame member has a first rectangular ring-shaped body with first, second, third and fourth side walls defining a first central space. The first and second side walls of the first rectangular ring-shaped body extend substantially perpendicular to one another. The third and fourth side walls of the first rectangular ring-shaped body are coupled to the first and second side walls of the first rectangular ring-shaped body and extend substantially perpendicular to one another. The first thermally conductive plate is coupled to the first, second, third and fourth side walls of the first rectangular ring-shaped body and is adapted to enclose the first central space. A first plate portion of the first thermally conductive plate is disposed on an outer surface of the second side wall of the first rectangular ring-shaped body. The first busbar has a first post and a first conductive body coupled to the first post. The first post extends outwardly from the first side wall of the first rectangular ring-shaped body. The first conductive body extends through the third side wall of the first rectangular ring-shaped body and outwardly therefrom. The first voltage sensing member has a first sensing post and a first sensing body coupled to the first sensing post. The first sensing post extends outwardly from the first side wall of the first rectangular ring-shaped body. The first sensing body extends through the fourth side wall of the first rectangular ring-shaped body and outwardly therefrom. The first battery cell has a first body portion and first and second electrical terminals extending outwardly from first and second ends, respectively, of the first body portion. The first electrical terminal of the first battery cell is coupled to the first conductive body of the first busbar. The second electrical terminal of the first battery cell is coupled to the first sensing body of the first voltage sensing member. The second battery cell has a second body portion and first and second electrical terminals extending outwardly from first and second ends, respectively, of the second body portion. The second electrical terminal of the second battery cell is coupled to the second electrical terminal of the first battery cell. The second battery frame assembly is coupled to the first battery frame assembly such that the first and second battery cells are disposed between the first and second battery frame assemblies.

BRIEF DESCRIPTION OF THE DRAWINGS

FIG. 7 is another exploded view of the first battery module of FIG. 6;

FIG. 8 is a schematic of a first battery frame assembly utilized in the first battery module of FIG. 6;

FIG. 9 is another schematic of the first battery frame assembly of FIG. 8;

FIG. 10 is an exploded schematic of the first battery frame assembly of FIG. 8;

FIG. 12 is a cross-sectional schematic of the first battery frame assembly of FIG. 8;

FIG. 13 is a schematic of a busbar utilized in the first battery frame assembly of FIG. 8;

FIG. 14 is a schematic of a voltage sensing member utilized in the first battery frame assembly of FIG. 8;

DETAILED DESCRIPTION

Figure 1:
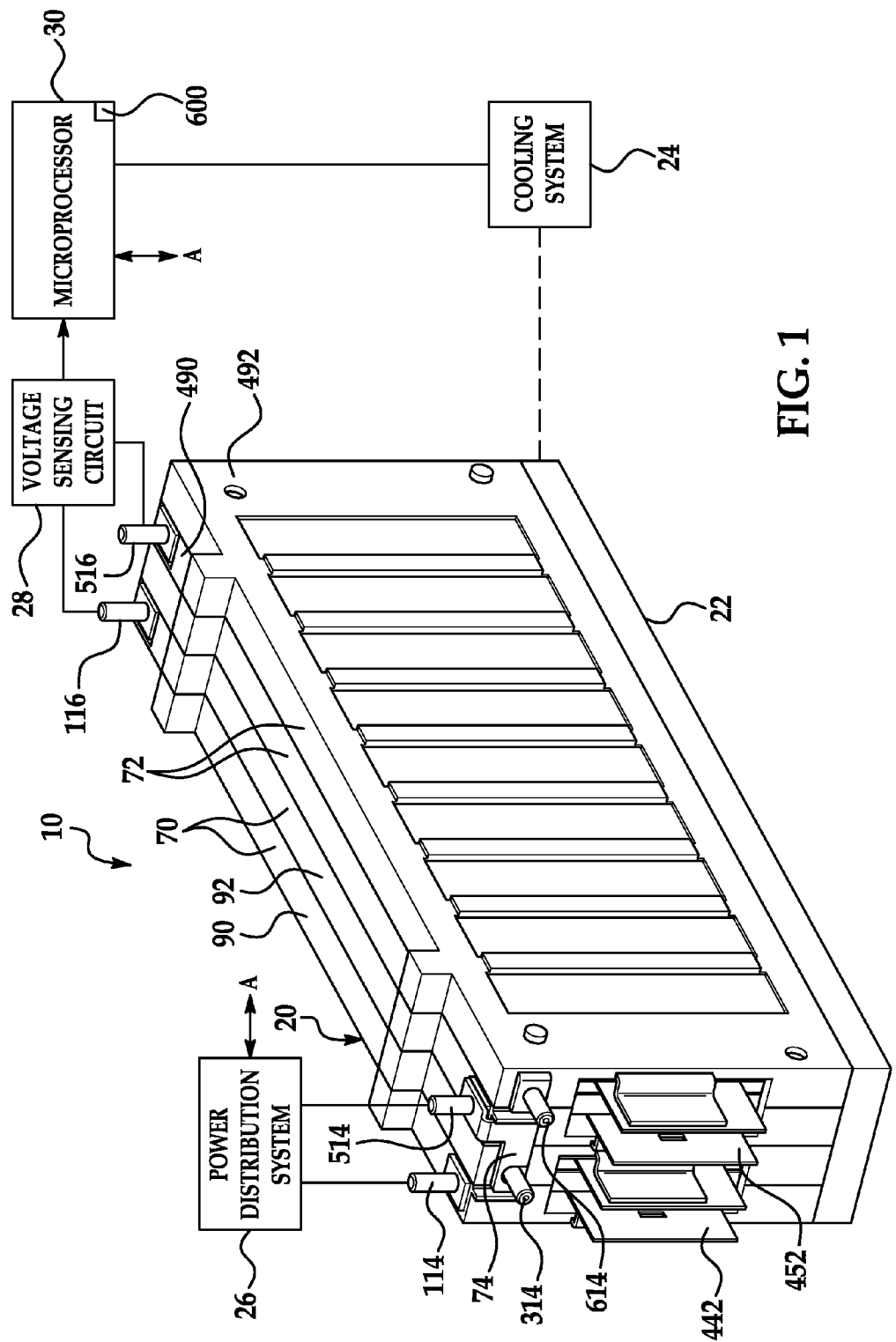
FIG. 1 is a schematic of a battery system having a battery pack in accordance with an exemplary embodiment.

Referring to FIGS. 1-4, a battery system 10 in accordance with an exemplary embodiment is provided. The battery system 10 includes a battery pack 20, a cooling plate 22, a cooling system 24, a power distribution system 26, a voltage sensing circuit 28, and a microprocessor 30. An advantage of the battery system 10 is that the system 10 utilizes the battery pack 20 having battery modules that are easily electrically coupled together utilizing busbars at least partially embedded within the battery frame assemblies of the battery modules without utilizing a separate interconnect circuit board. As a result, the battery pack 20 is easily "scalable" which means that additional battery modules can be readily added to the battery pack 20 by merely disposing a new battery module against another battery module in the battery pack and physically and electrically coupling a busbar of the new battery module to a busbar of the other battery module utilizing an external bus bar coupled therebetween. Further, the battery pack 20 utilizes voltage sensing members at least partially embedded within the battery frame assemblies which allows a voltage sensing circuit to be easily coupled thereto for monitoring a voltage level and a current level of the battery pack 20.

The battery pack 20 includes battery modules 70, 72 and an external busbar 74. The external busbar 74 electrically couples the battery module 70 to the battery module 72.

Figure 2:
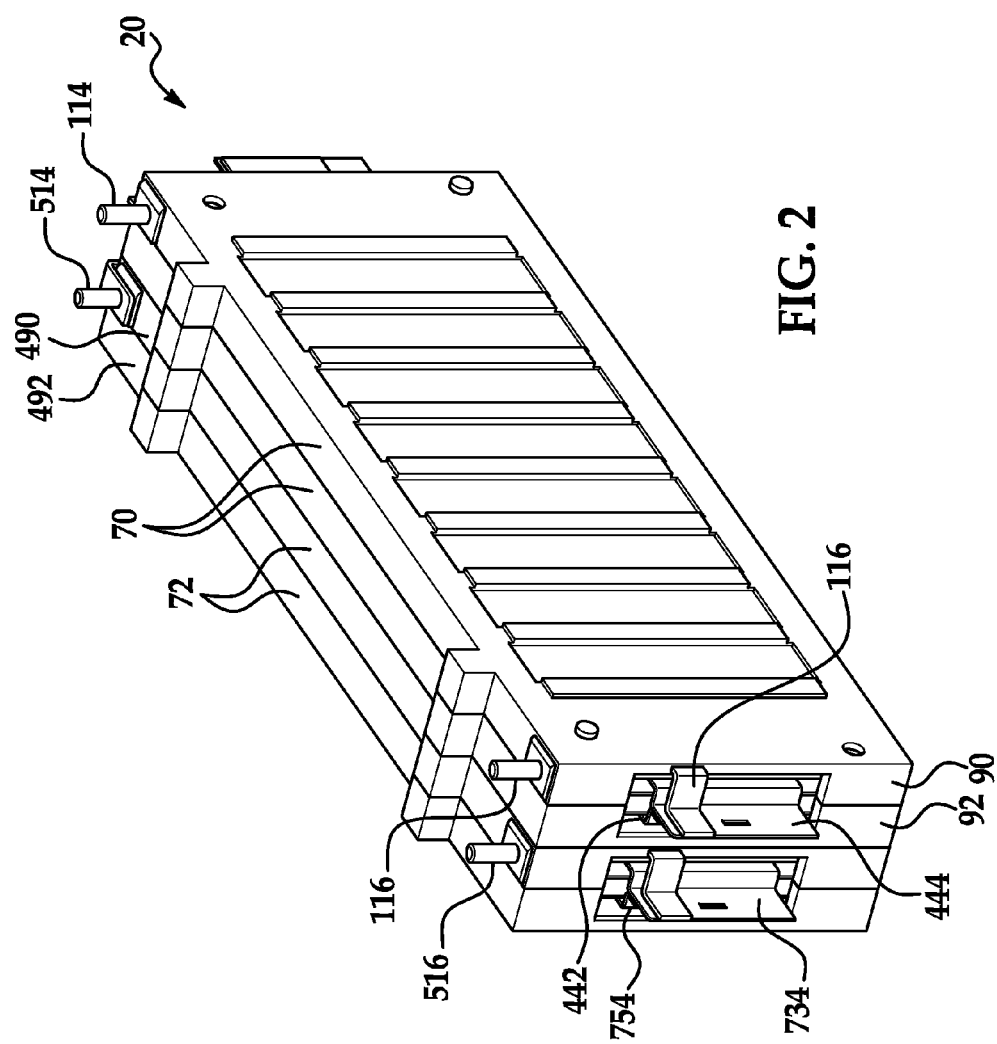
FIG. 2 is a schematic of the battery pack of FIG. 1.
Figure 6:
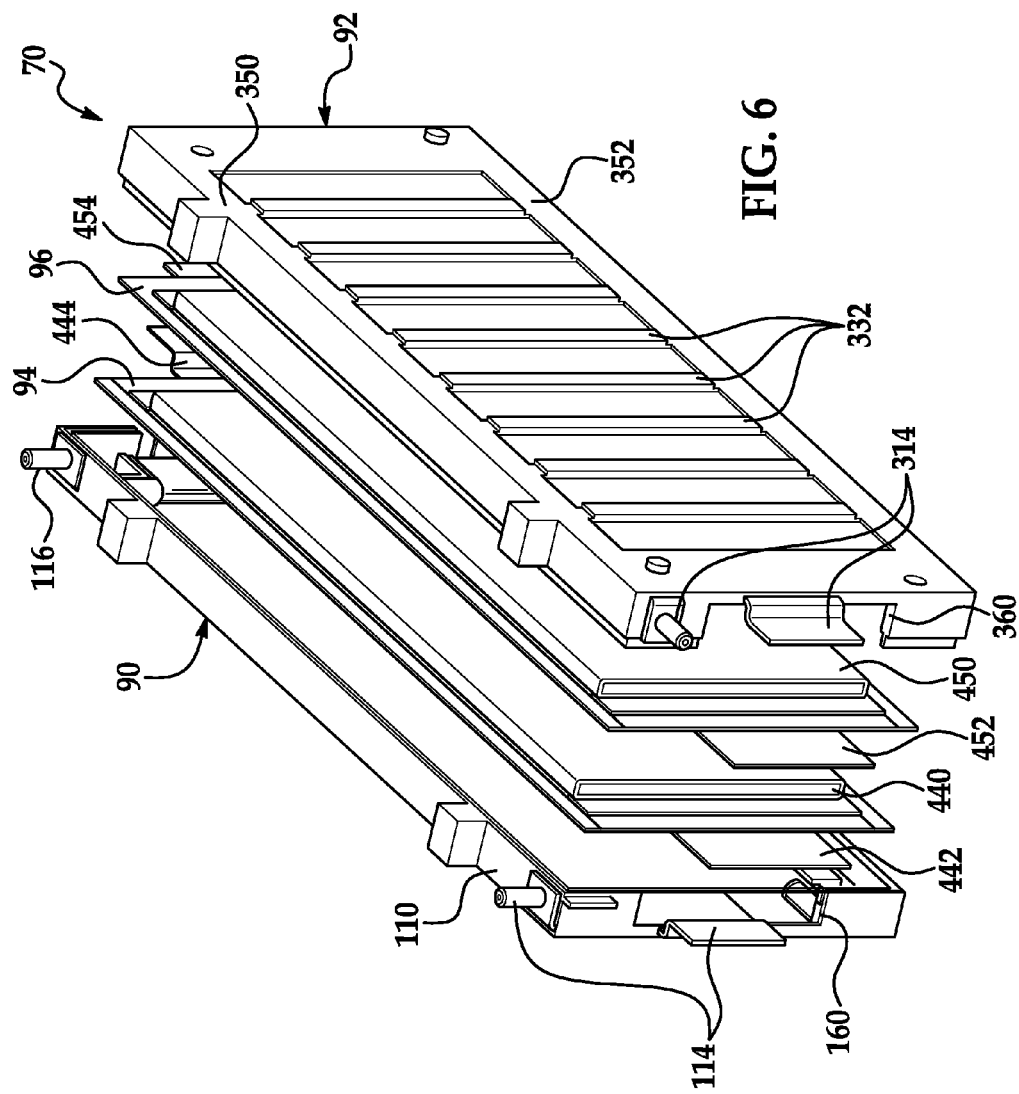
FIG. 6 is an exploded view of the first battery module of FIG. 3.
Figure 11:
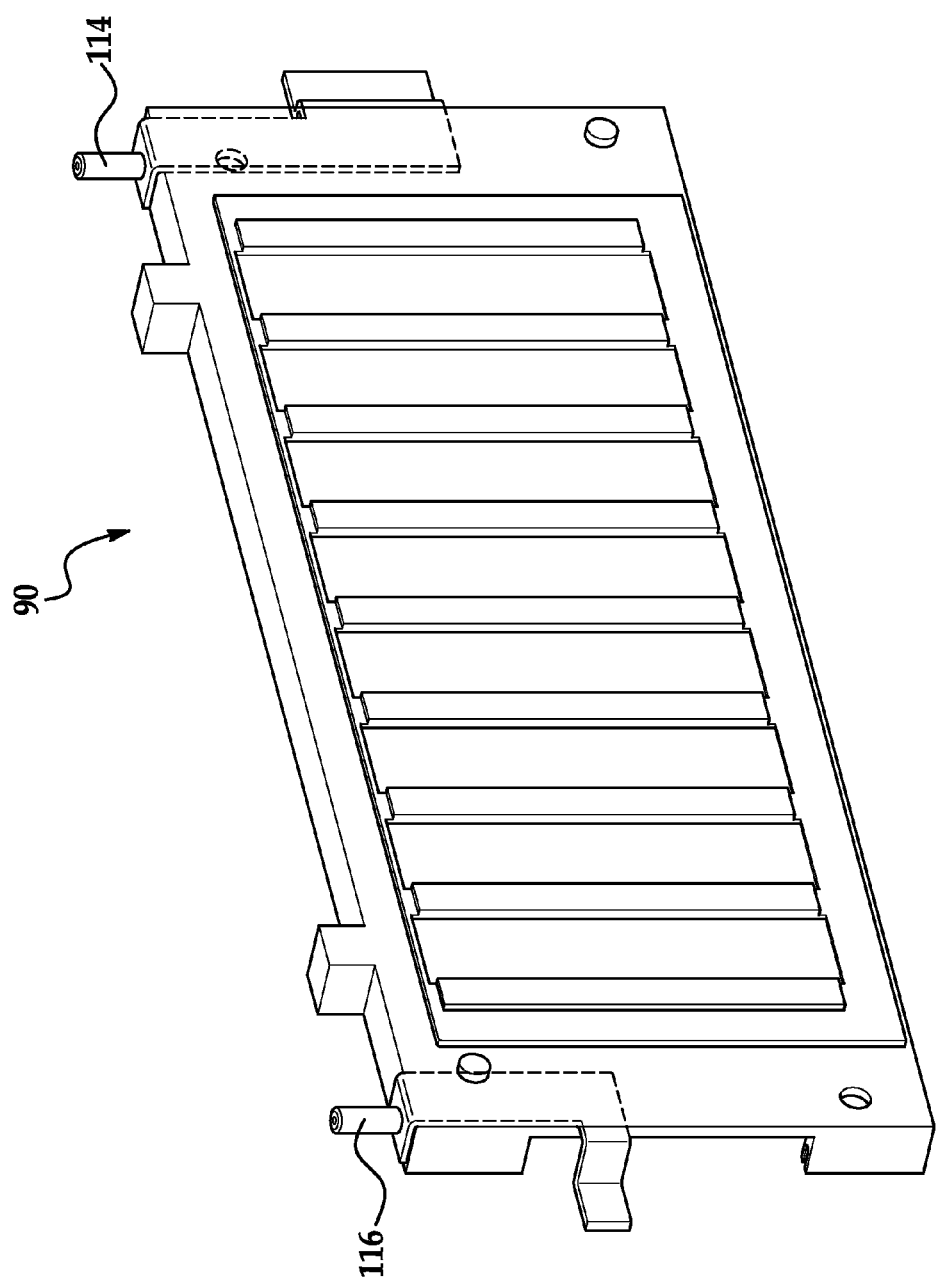
FIG. 11 is a partially transparent view of the first battery frame assembly of FIG. 8.

Referring to FIGS. 1, 2 and 6, the battery module 70 includes battery frame assemblies 90, 92 and battery cells 94, 96. The battery frame assemblies 90, 92 are coupled to one another and hold the battery cells 94, 96 therebetween.

Referring to FIGS. 8-12, the battery frame assembly 90 includes a plastic frame member 110, a thermally conductive plate 112, a busbar 114, and a voltage sensing member 116.

The plastic frame member 110 includes a rectangular ring-shaped body 130 and a plurality of cross-members 132. The rectangular ring-shaped body 130 has first, second, third and fourth side walls 150, 152, 154, 156 defining a first central space 140. The first and second side walls 150, 152 extend substantially perpendicular to one another. The third and fourth side walls 154, 156 are coupled to the first and second side walls 150, 152 and extend substantially perpendicular to one another. The third wall 154 includes a groove 160 extending therethrough for receiving an electrical terminal 442 (shown in FIG. 6) therethrough. Further, the fourth wall 156 includes a groove 162 extending therethrough for receiving an electrical terminal 444 (shown in FIG. 7) therethrough.

The plurality of cross-members 132 are coupled between and to the first and second side walls 150, 152 and extend across the first central space 140. Each cross-member of the plurality of cross-members 132 are disposed a predetermined distance from one another such that a space is formed between each pair of cross-members.

Referring to FIGS. 8 and 10, the thermally conductive plate 112 is coupled to the first, second, third and fourth side walls 150, 152, 154, 156 of the rectangular ring-shaped body 130 and is adapted to enclose the first central space 140. In particular, the thermally conductive plate 112 includes plate portions 170, 172. The plate portion 172 includes first, second, third, and fourth peripheral ends 180, 182, 184, 186. The plate portion 170 is coupled to the second end 182 of the plate portion 172 and extends substantially perpendicular to the plate portion 172. The first, second, third, and fourth peripheral ends 180, 182, 184, 186 of the plate portion 172 are at least partially encapsulated within the first, second, third and fourth side walls 150, 152, 154, 156, respectively, of the rectangular ring-shaped body 130. The second peripheral end 182 of the plate portion 172 extends through the second side wall 152 of the rectangular ring-shaped body 130. Further, the plate portion 170 of the thermally conductive plate 112 is disposed on an outer surface of the second side wall 152 of the rectangular ring-shaped body 130. In an exemplary embodiment, the thermally conductive plate 112 is constructed of steel. In an alternative embodiment, the thermally conductive plate 112 could be constructed of other thermally conductive materials such as copper, aluminum, or stainless steel for example.

Referring to FIGS. 6, 8 and 14, the busbar 114 is configured to be electrically coupled to the electrical terminal 442 of the battery cell 94. In an exemplary embodiment, the busbar 114 is constructed of an electrically conductive metal such as copper or steel for example. The busbar 114 has a post 200 and a conductive body 202 coupled to the post 200. The conductive body 202 includes plate portions 204, 206, 208, 210. The post 200 is coupled to the plate portion 204 and extends substantially perpendicular to the plate portion 204. The plate portion 202 is coupled to an end of the plate portion 204 extends substantially perpendicular to the plate portion 204. The plate portion 208 is coupled to a side edge of the plate portion 206 and extends substantially perpendicular to the plate portion 206. Also, the plate portion 210 is coupled to an end of the plate portion 208 and extends substantially perpendicular to the plate portion 208. Further, the plate portions 206, 210 extend substantially parallel to one another. The post 200 extends outwardly from the first side wall 150 of the rectangular ring-shaped body 130. The plate portion 210 of the conductive body 202 extends through the third side wall 154 of the rectangular ring-shaped body 130 proximate to the groove 160 and outwardly from the third side wall 154.

Referring to FIGS. 7, 8, 13 and 15, the voltage sensing member 116 is configured to be electrically coupled to the electrical terminal 444 of the battery cell 94. In an exemplary embodiment, the voltage sensing member 116 is constructed of an electrically conductive metal such as copper or steel for example. The voltage member 116 has a sensing post 220 and a sensing body 222 coupled to the sensing post 220. The sensing body 222 includes plate portions 224, 226, 228, 230. The sensing post 220 is coupled to the plate portion 224 extends substantially perpendicular to the plate portion 224. The plate portion 222 is coupled to an end of the plate portion 224 extends substantially perpendicular to the plate portion 224. The plate portion 228 is coupled to a side edge of the plate portion 226 and extends substantially perpendicular to the plate portion 226. Also, the plate portion 230 is coupled to an end of the plate portion 228 and extends substantially perpendicular to the plate portion 228. Further, the plate portions 226, 230 extend substantially parallel to one another. The sensing post 220 extends outwardly from the first side wall 150 of the rectangular ring-shaped body 130. The plate portion 230 of the sensing body 222 of the voltage sensing member 116 extends through the fourth side wall 156 of the rectangular ring-shaped body 130 proximate to the groove 162 and outwardly from the fourth side wall 156.

Referring to FIGS. 15-21, the battery frame assembly 92 includes a plastic frame member 310, a thermally conductive plate 312, and a busbar 314.

Referring to FIGS. 6 and 15-17, the plastic frame member 310 includes a rectangular ring-shaped body 330 and a plurality of cross-members 332. The rectangular ring-shaped body 330 has first, second, third and fourth side walls 350, 352, 354, 356 defining a second central space 340. The first and second side walls 350, 352 extend substantially perpendicular to one another. The third and fourth side walls 354, 356 are coupled to the first and second side walls 350, 352 and extend substantially perpendicular to one another. The third wall 354 includes a groove 360 extending therethrough for receiving an electrical terminal 452 (shown in FIG. 6) therethrough. Further, the fourth wall 156 includes a groove 362 (shown in FIG. 16) extending therethrough for receiving an electrical terminal 454 (shown in FIG. 6) therethrough.

The plurality of cross-members 332 are coupled between and to the first and second side walls 350, 352 and extend across the second central space 340. Each cross-member of the plurality of cross-members 332 are disposed a predetermined distance from one another such that a space is formed between each pair of cross-members.

Figure 15:
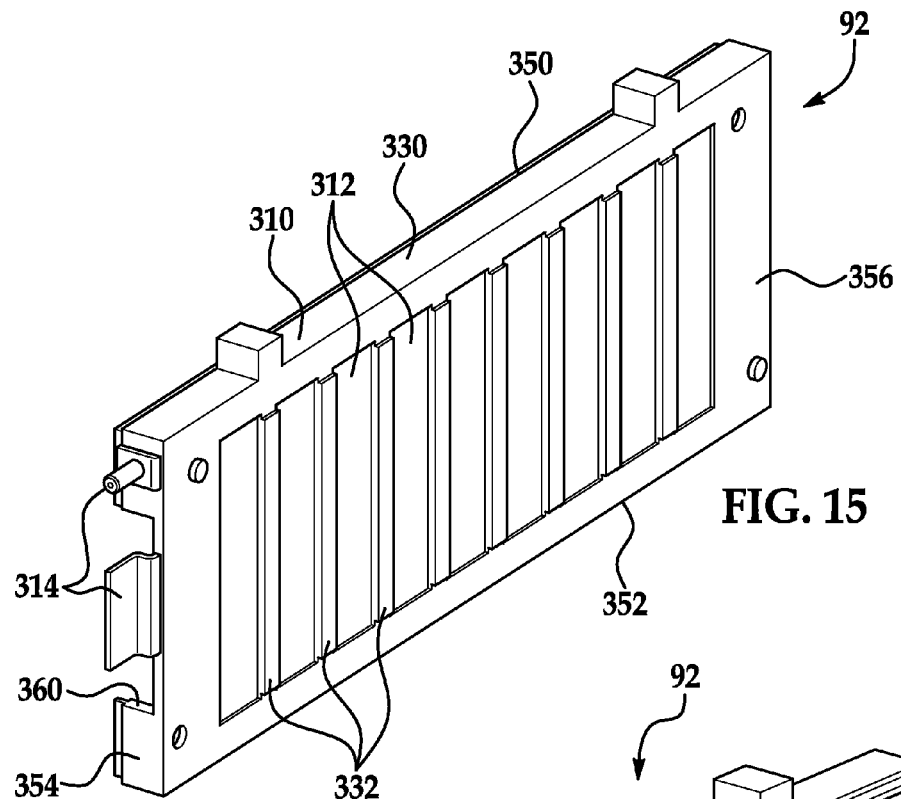
FIG. 15 is a schematic of a second battery frame assembly utilized in the first battery module of FIG. 6.
Figure 16:
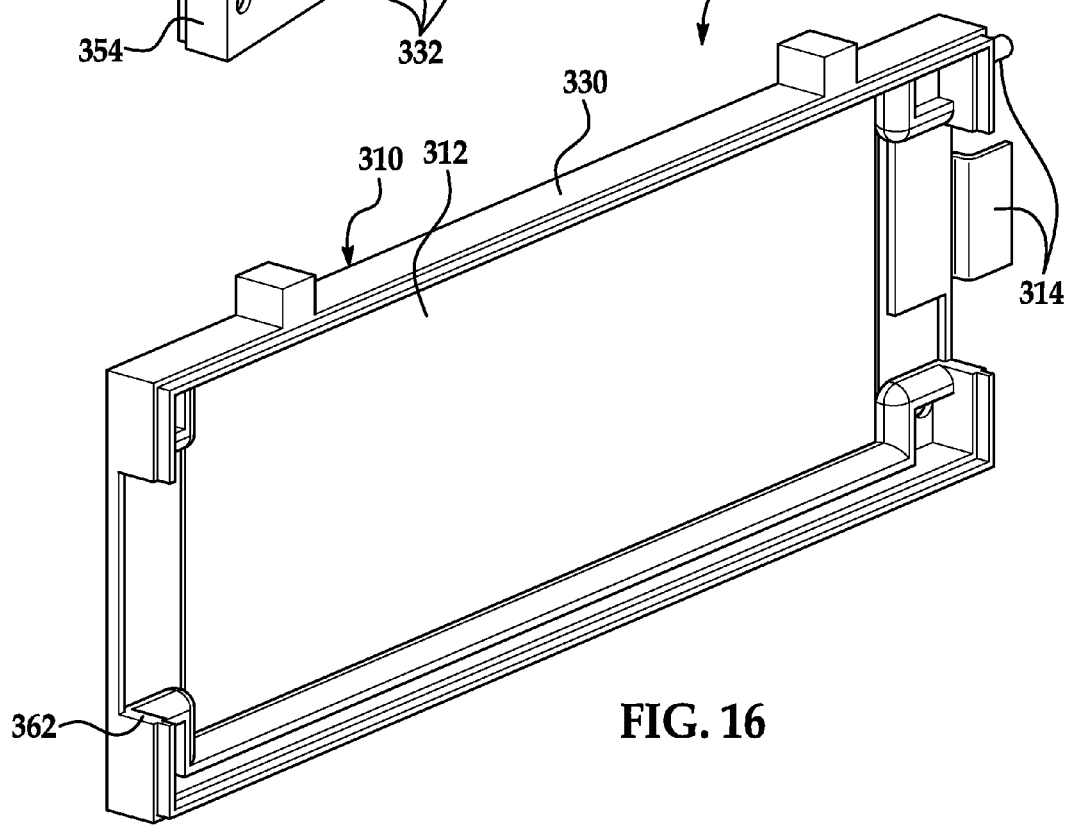
FIG. 16 is another schematic of the second battery frame assembly of FIG. 15.
Figure 17:
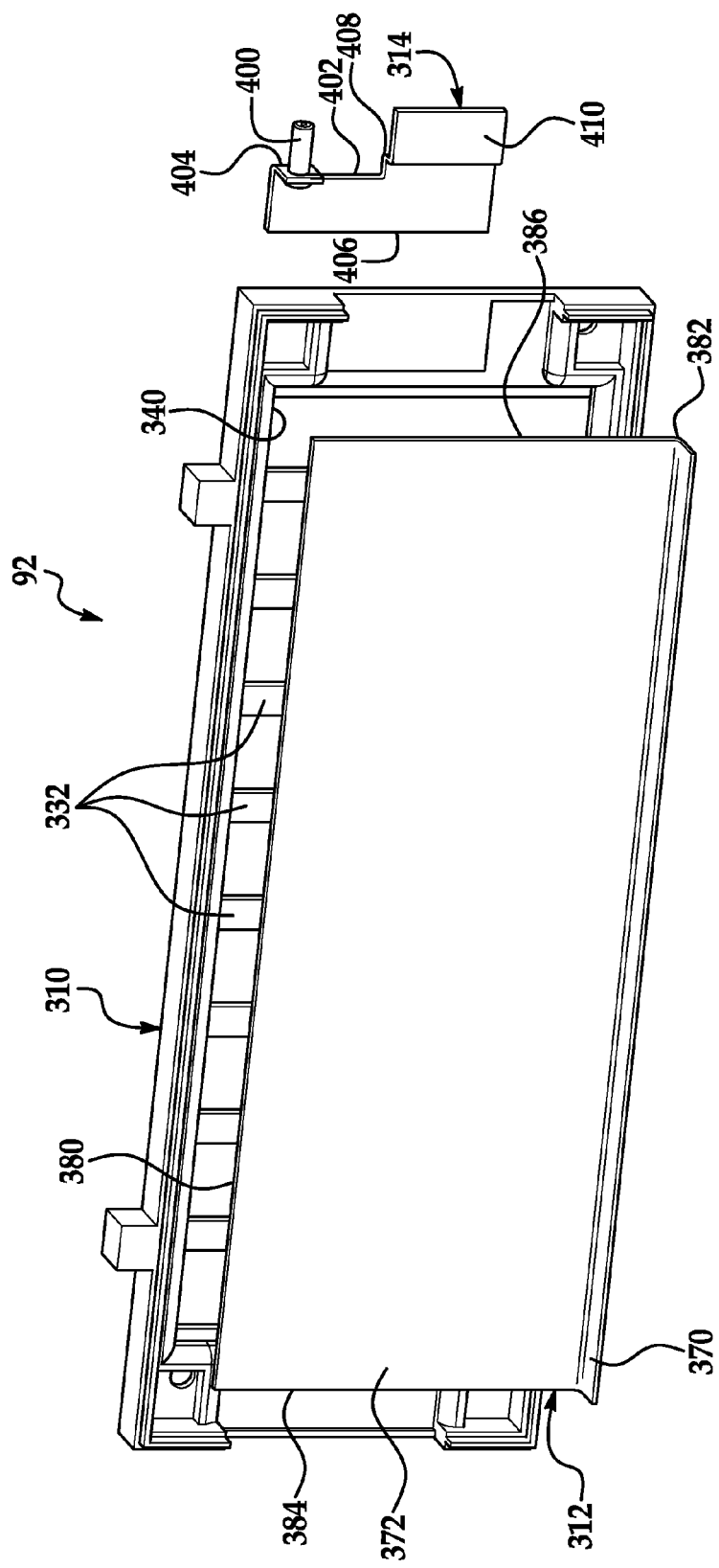
FIG. 17 is an exploded schematic of the second battery frame assembly of FIG. 15.
Figure 18:
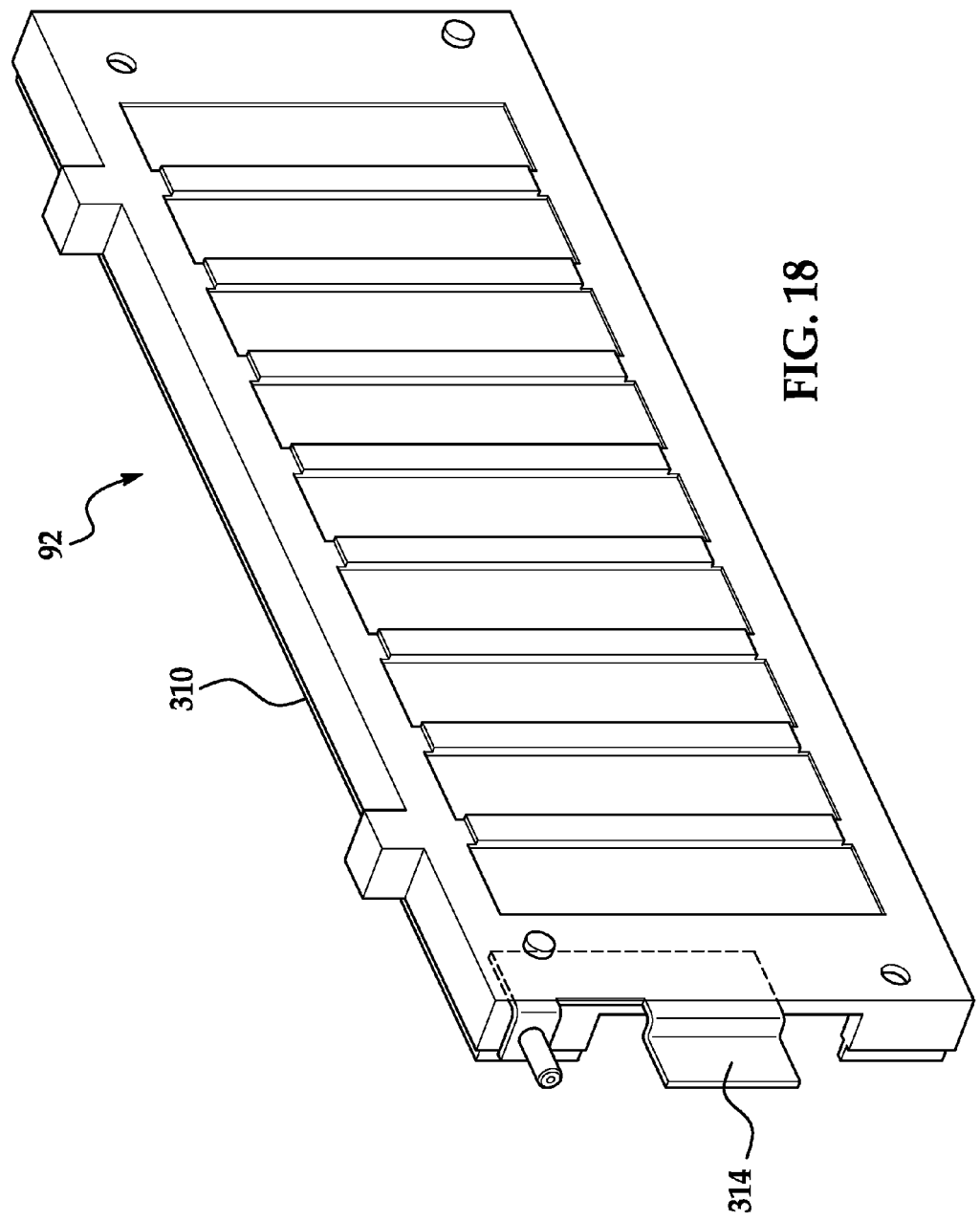
FIG. 18 is a partially transparent view of the second battery frame assembly of FIG. 15.
Figure 19:
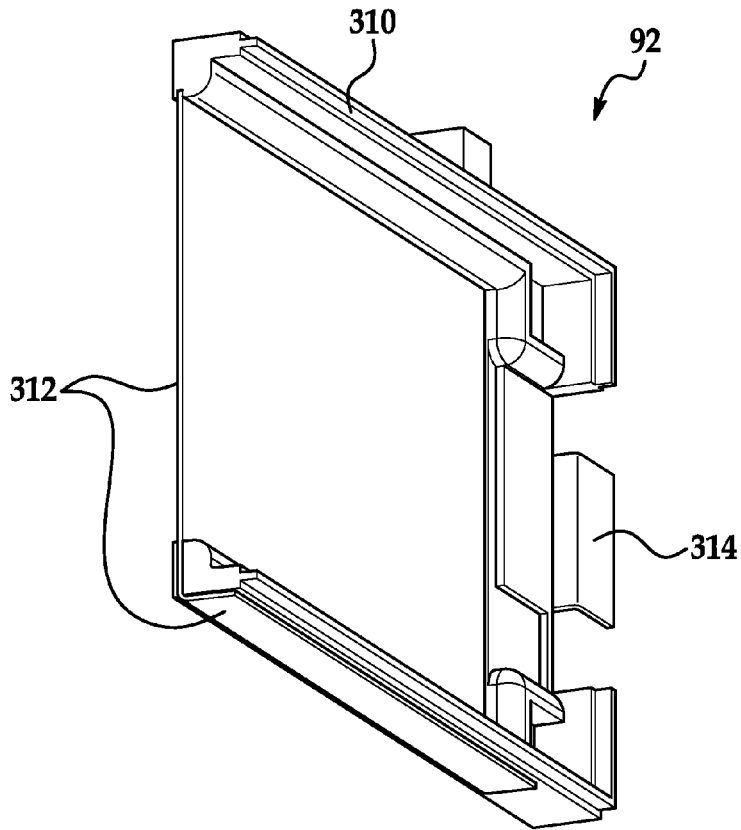
FIG. 19 is a cross-sectional schematic of the second battery frame assembly of FIG. 15.
Figure 20:
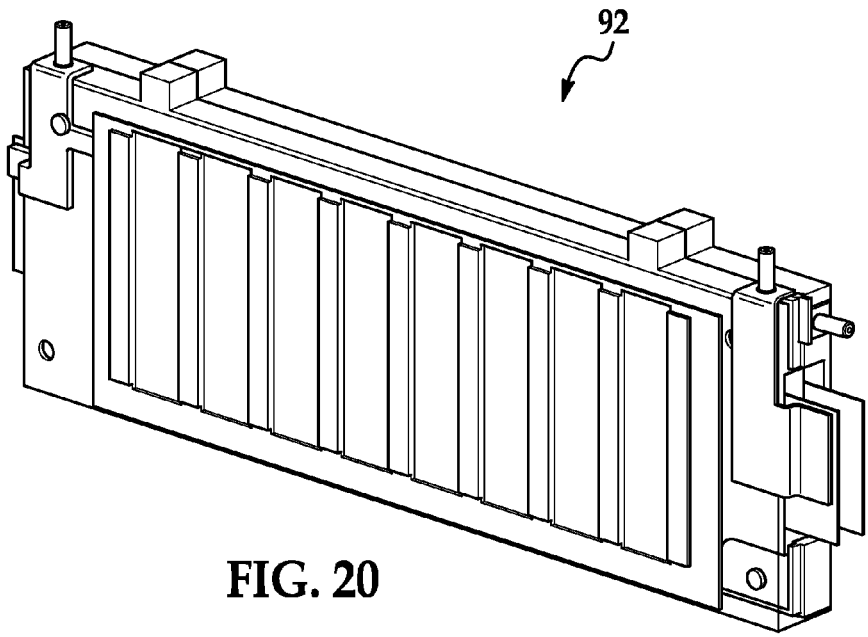
FIG. 20 is a schematic of a portion of the second battery frame assembly of FIG. 15.
Figure 21:
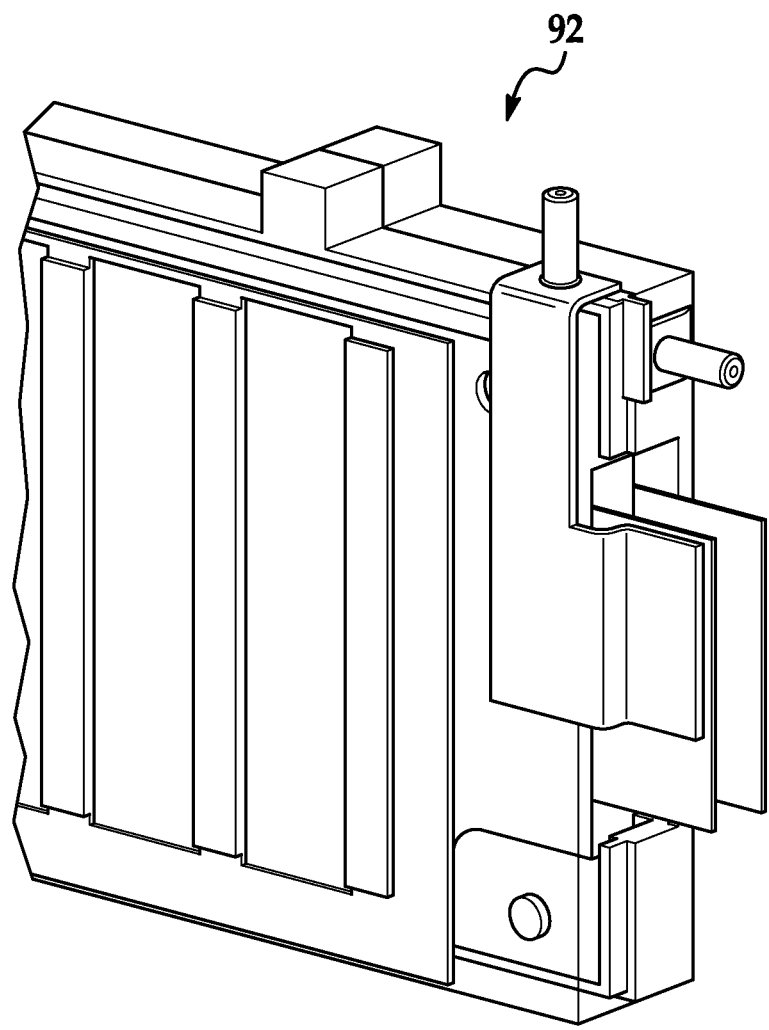
FIG. 21 is a schematic of an enlarged portion of the second battery frame assembly of FIG. 15.

Referring to FIGS. 15-17, the thermally conductive plate 312 is coupled to the first, second, third and fourth side walls 350, 352, 354, 356 of the rectangular ring-shaped body 330 and is adapted to enclose the second central space 340. In particular, the thermally conductive plate 312 includes plate portions 370, 372. The plate portion 372 includes first, second, third, and fourth peripheral ends 380, 382, 384, 386. The plate portion 370 is coupled to the second end 382 of the plate portion 372 and extends substantially perpendicular to the plate portion 372. The first, second, third, and fourth peripheral ends 380, 382, 384, 386 of the plate portion 372 are at least partially encapsulated within the first, second, third and fourth side walls 350, 352, 354, 356, respectively, of the rectangular ring-shaped body 330. The second peripheral end 382 of the plate portion 372 extends through the second side wall 352 of the rectangular ring-shaped body 330. Further, the plate portion 370 of the thermally conductive plate 312 is disposed on an outer surface of the second side wall 352 of the rectangular ring-shaped body 330. In an exemplary embodiment, the thermally conductive plate 312 is constructed of steel. In an alternative embodiment, the thermally conductive plate 312 could be constructed of other thermally conductive materials such as copper, aluminum, or stainless steel for example.

Referring to FIGS. 6 and 17, the busbar 314 is configured to be electrically coupled to the electrical terminal 452 of the battery cell 96. In an exemplary embodiment, the busbar 314 is constructed of an electrically conductive metal such as copper or steel for example. The busbar 314 has a post 400 and a conductive body 402 coupled to the post 400. The conductive body 402 includes plate portions 404, 406, 408, 410. The post 400 is coupled to the plate portion 404 and extends substantially perpendicular to the plate portion 404. The plate portion 402 is coupled to an end of the plate portion 404 and extends substantially perpendicular to the plate portion 404. The plate portion 408 is coupled to a side edge of the plate portion 406 and extends substantially perpendicular to the plate portion 406. Also, the plate portion 410 is coupled to an end of the plate portion 408 and extends substantially perpendicular to the plate portion 408. Further, the plate portions 406, 410 extend substantially parallel to one another. The post 400 extends outwardly from the third side wall 354 of the rectangular ring-shaped body 330. The plate portion 410 of the conductive body 402 extends through the third side wall 354 of the rectangular ring-shaped body 330 proximate to the groove 360 and outwardly from the third side wall 354.

Figure 3:
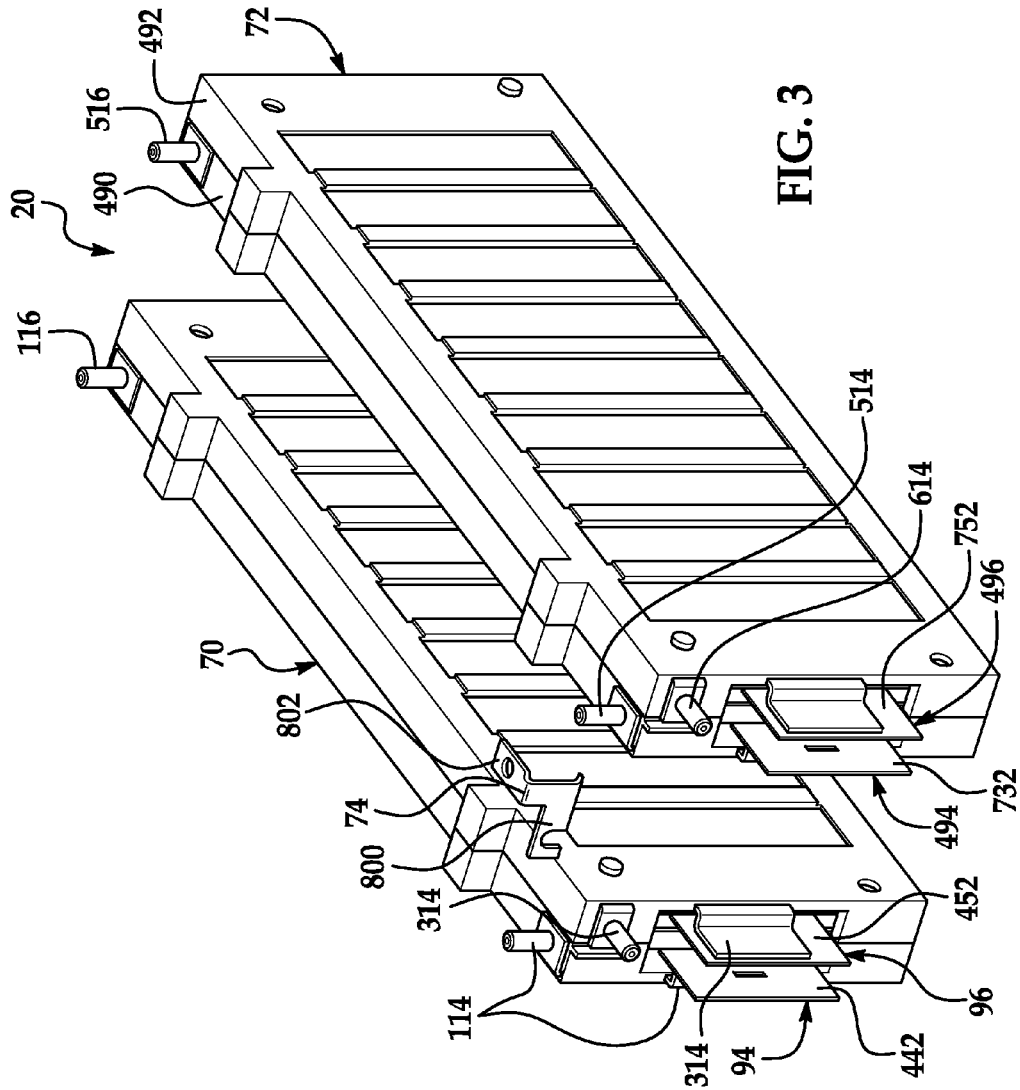
FIG. 3 is a partially exploded view of the battery pack of FIG. 2 illustrating first and second battery modules utilized therein.

Referring to FIGS. 3, 6, and 7, the battery cell 94 is disposed against the plastic frame member 110 and the thermally conductive plate 112 of the battery frame assembly 90, and is further disposed against the battery cell 96. The battery cell 94 includes a body portion 440 and electrical terminals 442, 444. The electrical terminal 442 extends outwardly from a first end of the body portion 440 and is electrically coupled to an active element within the body portion 440. The electrical terminal 442 further extends through a groove 160 formed in the plastic frame member 110. Further, the electrical terminal 442 is electrically coupled to the busbar 114. The electrical terminal 444 extends outwardly from a second end of the body portion 440 and is electrically coupled to the active element within the body portion 440. The electrical terminal 444 further extends through a groove 162 (shown in FIG. 7) formed in the plastic frame member 110. Further, the electrical terminal 444 is electrically coupled to both the voltage sensing member 116 and the electrical terminal 454 of the battery cell 96. In an exemplary embodiment, the battery cell 94 is a lithium-ion pouch-type battery cell. Of course, in an alternative embodiment, the battery cell 94 could be another type of battery cell such as a nickel metal hydride battery cell for example. During operation, the battery cell 94 generates a voltage between the electrical terminals 442, 444. Further, during operation, the body portion 440 of the battery cell 94 contacts the thermally conductive plate 112 which extracts heat energy from the body portion 440 of the battery cell 94 to cool the battery cell 94.

Referring to FIGS. 3, 6, and 7, the battery cell 96 is disposed against the plastic frame member 310 and the thermally conductive plate 312 of the battery frame assembly 92. The battery cell 96 includes a body portion 450 and electrical terminals 452, 454. The electrical terminal 452 extends outwardly from a first end of the body portion 450 and is electrically coupled to an active element within the body portion 450. The electrical terminal 452 further extends through a groove 360 formed in the plastic frame member 310. Further, the electrical terminal 452 is electrically coupled to the busbar 314. The electrical terminal 454 extends outwardly from a second end of the body portion 450 and is electrically coupled to the active element within the body portion 450. The electrical terminal 454 further extends through a groove 362 (shown in FIG. 7) formed in the plastic frame member 310. Further, the electrical terminal 454 is electrically coupled to the electrical terminal 444 of the battery cell 94. In an exemplary embodiment, the battery cell 96 is a lithium-ion pouch-type battery cell. Of course, in an alternative embodiment, the battery cell 96 could be another type of battery cell such as a nickel metal hydride battery cell for example. During operation, the battery cell 96 generates a voltage between the electrical terminals 452, 454. Further, during operation, the body portion 450 of the battery cell 96 contacts the thermally conductive plate 312 which extracts heat energy from the body portion 450 to cool the battery cell 96.

The battery frame assemblies 90, 92 are configured to be coupled together and to hold the battery cells 94, 96 therebetween. In an exemplary embodiment, the plastic frame members 110, 310 of the battery frame assemblies 90, 92, respectively, are ultrasonically welded together.

Referring to FIGS. 1-4, the battery module 72 is illustrated which has an identical structure as the battery module 70. The battery module 72 includes battery frame assemblies 490, 492 and battery cells 494, 496. The battery frame assemblies 490, 492 are coupled to one another and hold the battery cells 494, 496 therebetween.

The battery frame assembly 490 includes a plastic frame member 510, a thermally conductive plate 512, a busbar 514, and a voltage sensing member 516, which have an identical structure as the plastic frame member 110, the thermally conductive plate 112, the busbar 114, and the voltage sensing member 116, respectively.

Figure 4:
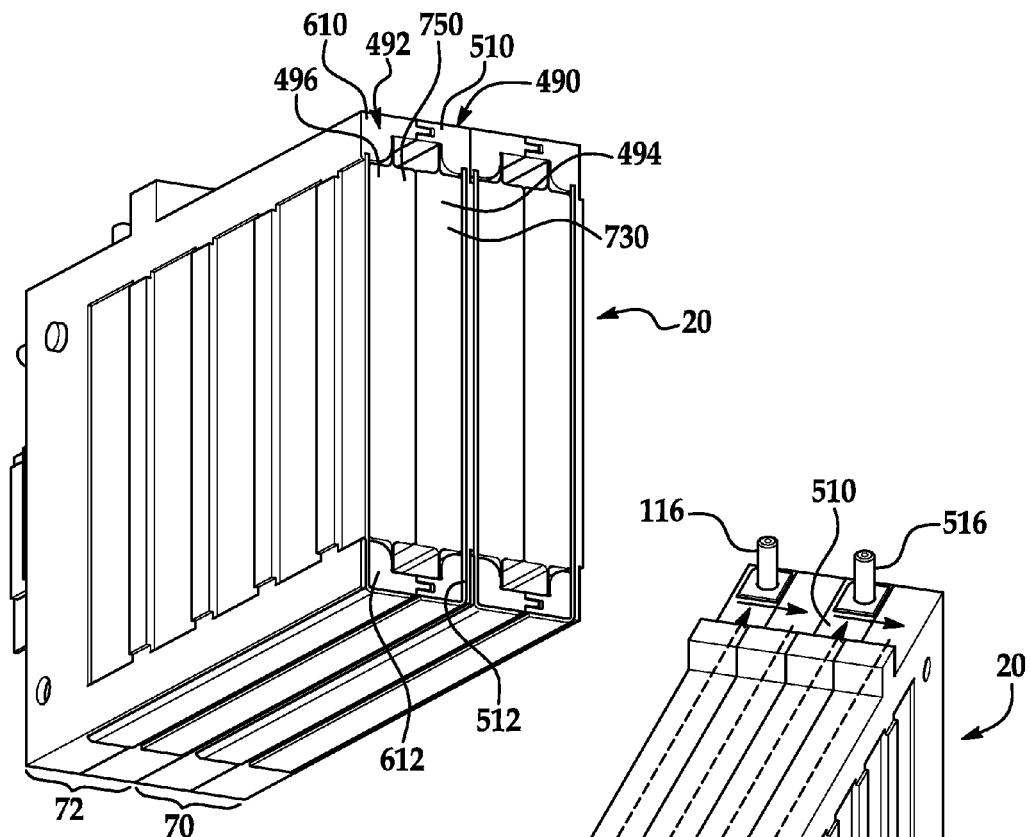
FIG. 4 is a cross-sectional view of the battery pack of FIG. 2.

Referring to FIGS. 4 and 7, the battery frame assembly 492 includes a plastic frame member 610, a thermally conductive plate 612, and a busbar 614, which have an identical structure as the plastic frame member 310, the thermally conductive plate 312, and the busbar 314, respectively.

Referring to FIGS. 2-4, the battery cell 494 is disposed against the plastic frame member 510 and the thermally conductive plate 512 of the battery frame assembly 490, and is further disposed against the battery cell 496. The battery cell 494 includes a body portion 730 (shown in FIG. 4) and electrical terminals 732, 734. The electrical terminal 732 extends outwardly from a first end of the body portion 730 and is electrically coupled to an active element within the body portion 730. The electrical terminal 732 further extends through a groove formed in the plastic frame member 510. Further, the electrical terminal 732 is electrically coupled to the busbar 514. The electrical terminal 734 extends outwardly from a second end of the body portion 730 and is electrically coupled to the active element within the body portion 730. The electrical terminal 734 further extends through a groove formed in the plastic frame member 510. Further, the electrical terminal 734 is electrically coupled to both the voltage sensing member 516, and the electrical terminal 754 of the battery cell 496. In an exemplary embodiment, the battery cell 494 is a lithium-ion pouch-type battery cell. Of course, in an alternative embodiment, the battery cell 494 could be another type of battery cell such as a nickel metal hydride battery cell for example. During operation, the battery cell 494 generates a voltage between the electrical terminals 732, 734. Further, during operation, the body portion 730 of the battery cell 494 contacts the thermally conductive plate 512 which extracts heat energy from the body portion 730 to cool the battery cell 494.

The battery cell 496 is disposed against the plastic frame member 610 and the thermally conductive plate 612 of the battery frame assembly 492. The battery cell 496 includes a body portion 750 and electrical terminals 752, 754. The electrical terminal 752 extends outwardly from a first end of the body portion 750 and is electrically coupled to an active element within the body portion 750. The electrical terminal 752 further extends through a groove formed in the plastic frame member 610. Further, the electrical terminal 752 is electrically coupled to the busbar 614. The electrical terminal 754 extends outwardly from a second end of the body portion 750 and is electrically coupled to the active element within the body portion 750. The electrical terminal 754 further extends through a groove formed in the plastic frame member 610. Further, the electrical terminal 754 is electrically coupled to the electrical terminal 734 of the battery cell 494. In an exemplary embodiment, the battery cell 496 is a lithium-ion pouch-type battery cell. Of course, in an alternative embodiment, the battery cell 496 could be another type of battery cell such as a nickel metal hydride battery cell for example. During operation, the battery cell 496 generates a voltage between the electrical terminals 752, 754. Further, during operation, the body portion 750 of the battery cell 496 contacts the thermally conductive plate 512 which extracts heat energy from the body portion 750 to cool the battery cell 496.

Figure 5:
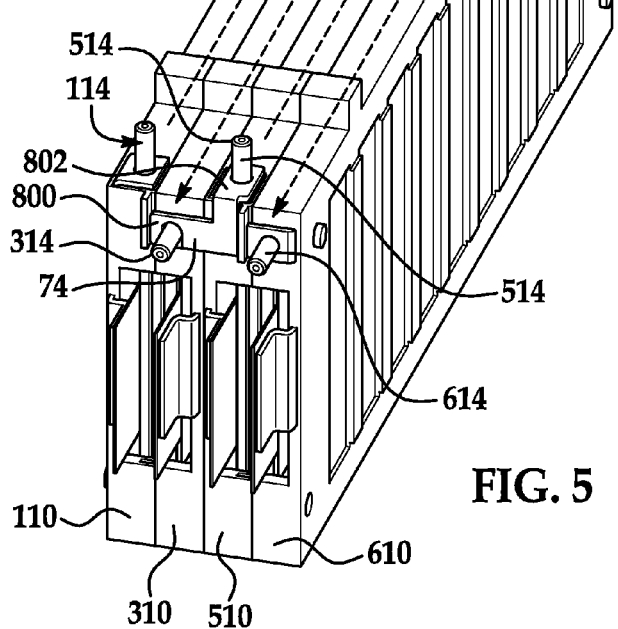
FIG. 5 is a schematic of the battery pack of FIG. 2 indicating a path of an electrical current flowing through the battery pack.

Referring to FIGS. 1, 3 and 5, the external busbar 74 is provided to electrically couple the battery module 70 to the battery module 72. The external busbar 74 is coupled to and between the post of the busbar 314 and the post of the busbar 514. The external busbar 74 includes busbar plate portions 800, 802 coupled to one another. The busbar plate portion 802 extends substantially perpendicular to the busbar plate portion 800. The busbar plate portion 800 includes a groove extending therethrough for receiving the post of the busbar 314 therethrough, and the busbar plate portion 802 includes an aperture extending therethrough for receiving the post of the busbar 514 therethrough. The busbar plate portion 800 is disposed on and against the third side wall of the rectangular ring-shaped body of the plastic frame member 310 and the third side wall of the rectangular ring-shaped body of the plastic frame member 510. The busbar plate portion 802 is disposed on and against a first side wall of the plastic frame member 510.

Referring to FIGS. 3-5, a path for an electrical current flowing through the battery pack 20 will now be described. The electrical current flows from the busbar 114 through the battery cell 94 to the voltage sensing member 116. From the voltage sensing member 116, the electrical current flows through the battery cell 96 to the busbar 314. From the busbar 314, the electrical current flows through the external busbar 74 to the busbar 514. From the busbar 514, the electrical current flows through the battery cell 494 to the voltage sensing member 516. From the voltage sensing member 516, the electrical current flows through the battery cell 496 to the busbar 614.

Referring to FIG. 1, the battery pack 20 is disposed on and against the cooling plate 22. The cooling plate 22 is provided to cool the battery pack 20 such that the battery pack 20 is maintained within a predetermined temperature range. The cooling plate 22 has internal passages extending therethrough for receiving either a coolant or a refrigerant therein from the cooling system 24. During operation, the cooling plate 22 extracts heat energy from the battery pack 20 and transmits the heat energy to the coolant or the refrigerant flowing through the cooling plate 22. The cooling system 24 is operably coupled to the microprocessor 30 and receives a control signal from the microprocessor 30 for controlling a temperature of the battery pack 20.

The power distribution system 26 is electrical coupled between the busbars 114, 514 of the battery modules 70, 72, respectively. The power distribution system 26 is provided to route the operational voltage generated by the battery pack 20 to a desired load, such as an inverter electrically coupled to an electric motor for example. The power distribution system 26 is operably coupled to the microprocessor 30 and receives a control signal from the microprocessor 30 for controlling the routing of the operational voltage from the battery pack 20 to the desired load.

The voltage sensing circuit 28 is electrically coupled between the voltage sensing members 116, 516. The voltage sensing circuit 28 generates a signal that is indicative of a voltage between the voltage sensing members 116, 516, and is further indicative of electrical current level flowing through the battery pack 20. The voltage sensing circuit 28 is operably coupled to the microprocessor 30 which receives the signal from the voltage sensing circuit 28 to determine a voltage level between the members 116, 516, and the electrical current level flowing through the battery pack 20.

The microprocessor 30 is provided to control operation of the cooling system 24 and the power distribution system 26. The microprocessor 30 is further provided to determine the electrical current level flowing through the battery pack 20 as discussed above. In particular, the microprocessor 30 is provided to execute software algorithms for implementing the above-mentioned functionality. The functionality described herein can be at least partially embodied in the form of one or more computer readable media having computer-executable instructions for practicing the method. The computer-readable media can comprise one or more volatile memory devices and/or one or more non-volatile memory devices wherein when the computer-executable instructions are loaded into one or more of the memory devices and executed by the microprocessor 30, the microprocessor 30 becomes an apparatus programmed to implement at least part of the functionality described herein.

The battery pack described herein provides a substantial advantage over other battery packs. In particular, the battery pack has battery modules that are easily electrically coupled together utilizing busbars at least partially embedded within the battery frame assemblies of the battery modules without utilizing a separate interconnect circuit board. Further, the battery pack utilizes voltage sensing members at least partially embedded within battery frame assemblies which allows a voltage sensing circuit to be easily coupled thereto for monitoring a voltage level and a current level of the battery pack.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:

a first battery module having first and second battery frame assemblies and first and second battery cells;

the first battery frame assembly having a first plastic frame member, a first thermally conductive plate, a first metal busbar, and a first voltage sensing member;

the first plastic frame member having a first rectangular ring-shaped body with first, second, third and fourth plastic side walls defining a first central space; the first and second plastic side walls of the first rectangular ring-shaped body extending substantially perpendicular to one another, the third and fourth plastic side walls of the first rectangular ring-shaped body being coupled to the first and second plastic side walls of the first rectangular ring-shaped body and extending substantially perpendicular to one another;

the first thermally conductive plate having first and second thermally conductive plate portions, the first thermally conductive plate portion having first, second, third, and fourth peripheral ends, the first thermally conductive plate portion being coupled to an end of the second thermally conductive plate portion and extending substantially perpendicular to the second thermally conductive plate portion; the first, second, third, and fourth peripheral ends of the first thermally conductive plate portion being at least partially encapsulated within the first, second, third and fourth plastic side walls, respectively, of the first rectangular ring-shaped body; the second thermally conductive plate portion being disposed on an outer surface of the second plastic side wall of the first rectangular ring-shaped body;

the first metal busbar having a first post and a first conductive body coupled to the first post; the first conductive body having first, second, and third metal plate portions, the first metal plate portion of the first conductive body being disposed on an outer surface of the first plastic side wall of the first rectangular ring-shaped body, the first post being coupled to the first metal plate portion of the first conductive body and extending outwardly from the first metal plate portion of the first conductive body, the second metal plate portion of the first conductive body extending outwardly from the third plastic side wall of the first rectangular ring-shaped body proximate to a first groove in the third plastic side wall, the third metal plate portion of the first conductive body of the first metal busbar being embedded within and covered by the third plastic side wall;

the first voltage sensing member having a first sensing post and a first sensing body coupled to the first sensing post, the first sensing body having first, and second, and third metal plate portions, the first metal plate portion of the first sensing body being disposed on an outer surface of the first plastic side wall, the first sensing post being coupled to the first metal plate portion of the first sensing body and extending outwardly from the first metal plate portion of the first sensing body; the second metal plate portion of the first sensing body extending outwardly from the fourth plastic side wall of the first rectangular ring-shaped body proximate to a second groove in the fourth plastic side wall, the third metal plate portion of the first sensing body of the first voltage sensing member being embedded within and covered by the fourth plastic side wall;

the first battery cell having a first body portion and first and second electrical terminals extending outwardly from first and second ends, respectively, of the first body portion; the first electrical terminal of the first battery cell extending through the first groove and being coupled to the second metal plate portion of the first conductive body of the first metal busbar; the second electrical terminal of the first battery cell extending through the second groove and being coupled to the second metal plate portion of the first sensing body of the first voltage sensing member;

the second battery cell having a second body portion and first and second electrical terminals extending outwardly from first and second ends, respectively, of the second body portion; the second electrical terminal of the second battery cell being coupled to the second electrical terminal of the first battery cell; and the second battery frame assembly being coupled to the first battery frame assembly such that the first and second battery cells are disposed between the first and second battery frame assemblies.

2. The battery pack of claim 1, wherein the second battery frame assembly includes a second plastic frame member, a second thermally conductive plate, and a second metal busbar;

the second plastic frame member having a second rectangular ring-shaped body with first, second, third and fourth plastic side walls defining a second central space; the first and second plastic side walls of the second rectangular ring-shaped body extending substantially perpendicular to one another, the third and fourth plastic side walls of the second rectangular ring-shaped body being coupled to the first and second plastic side walls of the second rectangular ring-shaped body and extending substantially perpendicular to one another;

the second thermally conductive plate being coupled to the first, second, third and fourth plastic side walls of the second rectangular ring-shaped body and being adapted to enclose the second central space, a first thermally conductive plate portion of the second thermally conductive plate being disposed on an outer surface of the second plastic side wall of the second rectangular ring-shaped body;

the second metal busbar having a second post and a second conductive body coupled to the second post, the second post extending outwardly from the first plastic side wall of the second rectangular ring-shaped body; the second conductive body extending through the third plastic side wall of the second rectangular ring-shaped body and outwardly therefrom; and the first electrical terminal of the second battery cell being coupled to the second conductive body of the second metal busbar.

3. The battery pack of claim 2, wherein the first electrical terminal of the second battery cell extends through a third groove in the third plastic side wall of the second rectangular ring-shaped body of the second plastic frame member.

4. The battery pack of claim 3, wherein the second electrical terminal of the second battery cell extends through a fourth groove in the fourth plastic side wall of the second rectangular ring-shaped body of the second plastic frame member.

5. The battery pack of claim 2, wherein the first body portion of the first battery cell contacts at least a portion of the first thermally conductive plate of the first battery frame assembly, and the second body portion of the second battery cell contacts at least a portion of the second thermally conductive plate of the second battery frame assembly.

6. The battery pack of claim 2, further comprising:
a second battery module having third and fourth battery frame assemblies and a third battery cell, the third battery cell being disposed between the third and fourth battery frame assemblies;
the third battery frame assembly having a third plastic frame member, a third thermally conductive plate, and a third metal busbar;
the third plastic frame member having a third rectangular ring-shaped body with first, second, third and fourth plastic side walls defining a third central space; the first and second plastic side walls of the third rectangular ring-shaped body extending substantially perpendicular to one another, the third and fourth plastic side walls of the third rectangular ring-shaped body being coupled to the first and second plastic side walls of the third rectangular ring-shaped body and extending substantially perpendicular to one another;
the third thermally conductive plate being coupled to the first, second, third and fourth plastic side walls of the third rectangular ring-shaped body and being adapted to enclose the third central space, a first thermally conductive plate portion of the third thermally conductive plate being disposed on an outer surface of the second plastic side wall of the third rectangular ring-shaped body;
the third metal busbar having a third post and a third conductive body coupled to the third post, the third post extending outwardly from the first plastic side wall of the third rectangular ring-shaped body; the third conductive body extending through the third plastic side wall of the third rectangular ring-shaped body and outwardly therefrom;
the third battery cell having a third body portion and first and second electrical terminals extending outwardly from first and second ends, respectively, of the third body portion thereof; the first electrical terminal of the third battery cell being coupled to the third conductive body of the third metal busbar; and
an external busbar coupled to and between the second post of the second metal busbar and the third post of the third metal busbar.

7. The battery pack of claim 6, wherein the external busbar includes first and second metal busbar plate portions coupled to one another, the second metal busbar plate portion extending substantially perpendicular to the first metal busbar plate portion, the first metal busbar plate portion being disposed on and against the third plastic side wall of the second rectangular ring-shaped body of the second plastic frame member and the third plastic side wall of the third rectangular ring-shaped body of the third plastic frame member; the second metal busbar plate portion being disposed on and against the first plastic side wall of the third rectangular ring-shaped body.

8. The battery pack of claim 7, wherein:
the third battery frame assembly further includes a second voltage sensing member having a second sensing post and a second body coupled to the second sensing post, the second sensing post extending outwardly from the first plastic side wall of the third rectangular ring-shaped body; the second sensing body extending through the fourth plastic side wall of the third rectangular ring-shaped body and outwardly therefrom; and
the second electrical terminal of the third battery cell being coupled to the second sensing post of the second voltage sensing member.

9. The battery pack of claim 1, wherein the first plastic frame member further includes a first plurality of cross-members; the first plurality of cross-members extending between the first and second plastic side walls of the first rectangular ring-shaped body and extending across the first central space, the first plurality of cross-members defining a first plurality of open spaces therebetween in the first central space.

10. The battery pack of claim 1, further comprising a cooling plate that has the second thermally conductive plate portion of the first thermally conductive plate disposed thereon, the cooling plate extracting heat energy from the first thermally conductive plate to cool the first and second battery cells.

* * * * *